United States Patent
Carau, Sr. et al.

(10) Patent No.: US 6,842,799 B2
(45) Date of Patent: *Jan. 11, 2005

(54) APPLIANCE COMMUNICATIONS MANAGER

(75) Inventors: Frank P Carau, Sr., Loveland, CO (US); Michael L Rudd, Fort Collins, CO (US); Philip E Jensen, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/681,542

(22) Filed: Oct. 8, 2003

(65) Prior Publication Data

US 2004/0122996 A1 Jun. 24, 2004

Related U.S. Application Data

(63) Continuation of application No. 10/327,570, filed on Dec. 19, 2002, now Pat. No. 6,651,118, which is a continuation of application No. 09/392,897, filed on Sep. 9, 1999, now Pat. No. 6,516,358.

(51) Int. Cl.[7] ........................ G06F 13/14; G06F 13/20
(52) U.S. Cl. .......................... 710/36; 710/37; 710/39; 709/227; 709/238; 709/244; 709/252; 709/268
(58) Field of Search ....................... 710/36, 37, 39; 709/227, 228, 238, 244, 252, 268

(56) References Cited

U.S. PATENT DOCUMENTS

| 5,109,222 | A | | 4/1992 | Welty | |
|---|---|---|---|---|---|
| 5,276,679 | A | | 1/1994 | McKay et al. | |
| 5,555,298 | A | | 9/1996 | Jonsson | |
| 5,790,800 | A | * | 8/1998 | Gauvin et al. | 709/227 |
| 6,003,084 | A | | 12/1999 | Green et al. | |
| 6,119,180 | A | * | 9/2000 | Terho et al. | 710/72 |
| 6,289,373 | B1 | | 9/2001 | Dezonno | |
| 6,618,745 | B2 | * | 9/2003 | Christensen et al. | 709/201 |

FOREIGN PATENT DOCUMENTS

| EP | 000592091 A2 | * | 4/1994 | G06F/9/46 |
|---|---|---|---|---|
| EP | 001079658 A2 | * | 2/2001 | H04Q/11/04 |
| WO | WO 98/29944 | | 7/1998 | |
| WO | WO 99/09780 | | 2/1999 | |

* cited by examiner

*Primary Examiner*—Rehana Perveen

(57) ABSTRACT

Methods and apparatus are disclosed for communication between appliances. In one embodiment, the method comprises receiving at an appliance communications manager that stands apart from source and destination appliances, a connection request from a source appliance, receiving at the appliance communications manager destination appliance communication information for a destination appliance, and receiving at the appliance communications manager a communication message from the source appliance. The method additionally comprises storing the communication message in a data memory of the appliance communications manager, establishing, via the appliance communications manager, a communication link with the destination appliance, and transferring the stored communication message to the destination appliance via the communication link.

17 Claims, 5 Drawing Sheets

APPLIANCE COMMUNICATIONS MANAGER

CROSS-REFERENCE TO RELATED APPLICATION

This is a continuation of U.S. patent application Ser. No. 10/327,570, filed on Dec. 19, 2002, now U.S. Pat. No. 6,651,118, which is a continuation of U.S. patent application Ser. No. 09/392,897, now U.S. Pat. No. 6,516,358 filed on Sep. 9, 1999.

BACKGROUND OF THE INVENTION

The increasing use of portable computing appliances means that a user may store and work on data files on a fixed desktop computer at his workstation on site, and take a personal computing appliance such as a portable or palm top computer with him for use off-site. Data may be transferred between the desktop appliance and the personal computer appliance either by a close range infrared (I.R.) or other optical link, or a cable when the two are in close proximity, or via a modem link when the user has the personal computing appliance with him off site. The remote access provided by electronic appliances allows greater flexibility and convenience.

Appliances contain built in communications ability, such as infrared or very short range radio, which allows direct short distance communication. However, communications between appliances at a distance presents heightened challenges to users. Different communication standards, capabilities, and interfaces for plain old telephone systems (POTS), cellular telephones, wireless local area networks (LANs), and wide area networks (WANs) add complexity to individual appliances to manage the broad range of connections.

Accordingly, a need exists for a simplified appliance communications manager that allows direct appliance-to-appliance communication regardless of the complexity of establishing the logical communication connection—either for short- or long-range communications.

SUMMARY OF THE INVENTION

Apparatus and methods are disclosed for communication between appliances. In one embodiment a connection request from a source appliance is received at an appliance communications manager that stands apart from source and destination appliances. Appliance communication information for a destination appliance is received at the appliance communications manager. A communication message from the source appliance is also received at the appliance communications manager. The communication message is stored in a data memory of the appliance communications manager and a communication link with the destination appliance is established via the appliance communications manager. The stored communication link is then transferred to the destination appliance via the communication link.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel appliance communication manager for allowing simplified user communication transactions is described in detail hereinafter. Although the invention is described in the context of the illustrative embodiments, which employ preferred components such as the Hewlett Packard JetSend® communication protocol as the standard appliance language, it will be appreciated by those skilled in the art that the principles of the invention extend to any appliance communications management system that allows direct communication between multiple appliances, regardless of physical proximity and I/O interface requirements of the appliances, using a standard appliance communication language.

Figure 1:
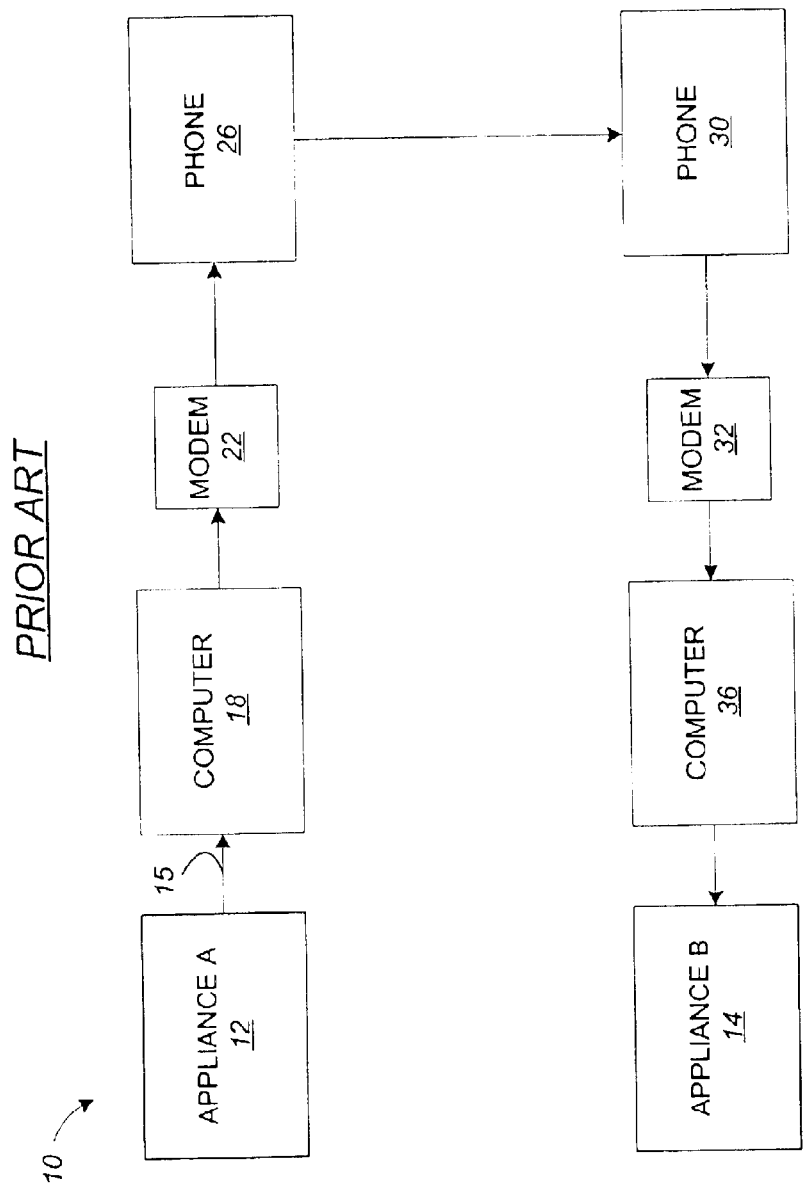
FIG. 1 is a block diagram of a prior art communication system.

To facilitate an understanding of the advantageous features of the invention, a description of a prior art appliance communication system is first presented. Turning now to FIG. 1, there is illustrated a prior art communication system 10 in which a first appliance A 12 communicates with a remotely located second appliance B 14. To allow such communication, a computer system 18 such as a notebook computer receives signals 15 from appliance A 12. Appliance A 12 and computer 18 are capable of communicating both remotely, e.g. via a modem link, and directly, when the host and portable device are docked or otherwise locally associated. Computer 18 interprets the received appliance signals 15 to extract communication information, including the destination address and/or transmission frequency, the actual information that is to be transmitted, etc., for the transaction. Based on this information, computer 18 sets up a modem 22 and causes it to dial up a phone 26, such as a plain old telephone system (POTS), or analog or digital cellular phone. The phone 26 establishes communication with the destination appliance B 14, typically via a phone 30, modem 32, and computer 36 in communication with Appliance B 14 at the other end of the logical connection. Appliance B 14 and computer 36 are capable of communicating both remotely, e.g. via a modem link, and directly, when the host and portable device are docked or otherwise locally associated.

The prior art communication system 10 of FIG. 1 is problematic for several reasons. First, the use of an intermediate computer to set up and establish a communications link between two appliances requires significant intervention on the part of the user to activate the software that controls input (e.g., via an infrared (IR) port) from one appliance and the software that controls output (e.g., via an analog or digital modem) to another appliance. This requires booting up the computer, starting up the receive software, ensuring that the data from the source appliance is received, translating the received data to a format recognizable by the destination appliance, starting up the send software (e.g., a fax program), setting up the send connection (e.g., entering the name, address, phone number, transfer protocol, and data format) within the send software, and monitoring the status of the send software to make sure that the data was transferred to the destination appliance without error. As will be appreciated, the user's assistance in the communication transaction is necessary and significant. In addition, the requirement for intermediate equipment, software, and user intervention significantly increases the time required to establish a connection link between appliances and complete a communication transaction.

Figure 2:
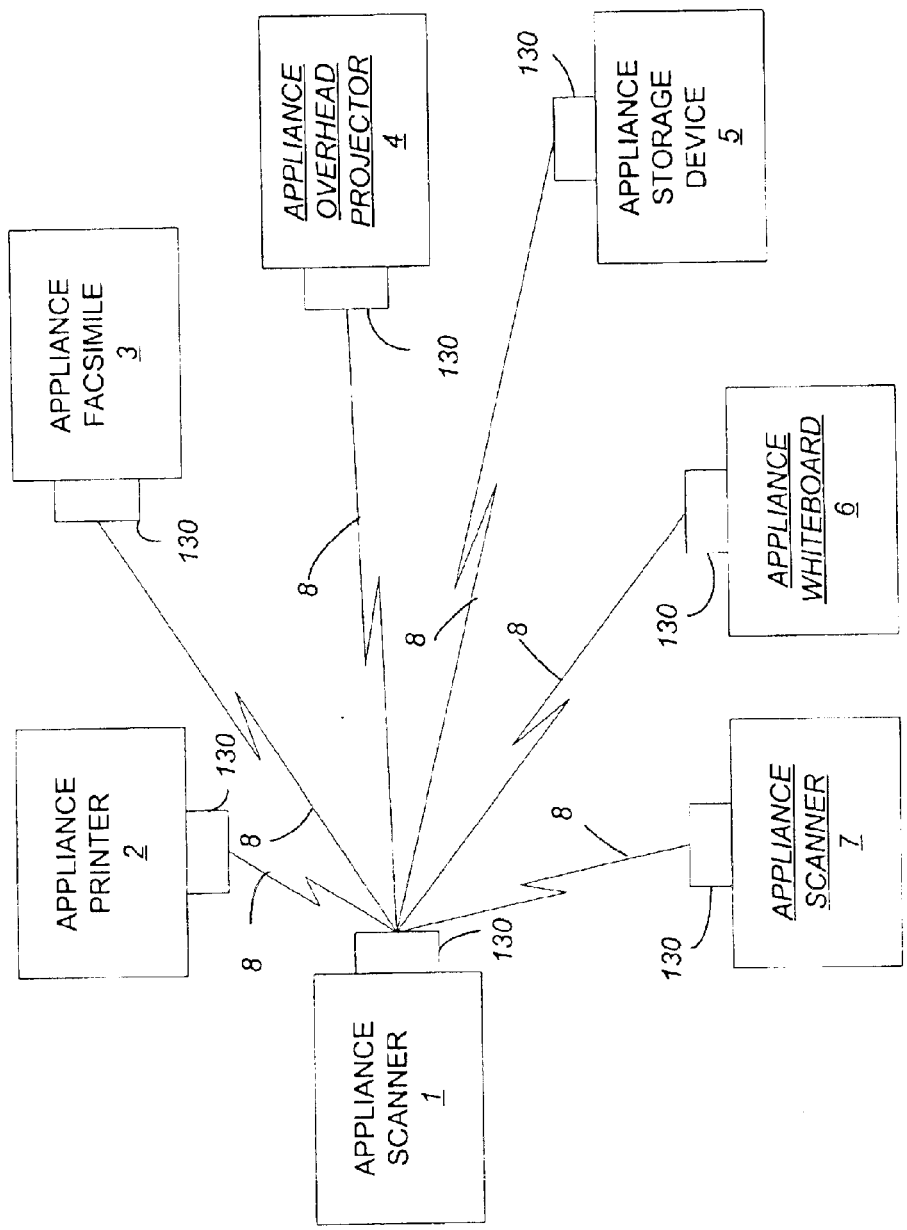
FIG. 2 is a high level block diagram of a communication system illustrating appliance communication.

In the environment contemplated for use of the invention, appliances are capable of communicating directly with one another, as illustrated in FIG. 2. Thus, for example, an appliance scanner 1 is capable of communicating directly with one or more of appliance printer 2, appliance facsimile machine 3, appliance overhead projector 4, appliance storage device 5 (e.g., a document briefcase), appliance whiteboard 6, and/or another appliance scanner 7. Communication links 8 are established between the communicating appliances by way of an appliance communication manager 130 implemented in accordance with the invention. The appliance communication manager 130 may be a stand-alone device that connects to each of the communicating appliances 1–7, or alternatively may be integrated into each of the communicating appliances 1–7. Importantly, as discussed hereinafter, not every appliance requires an appliance communications manager 130 in order to communicate. As long as at least one of the source and destination appliances is connected to an appliance communications manager 130, and the particular implementation of the appliance communications manager 130 includes communications modules that allow it to communicate using the technologies of both the source and destination, communication is easily established.

Figure 3:
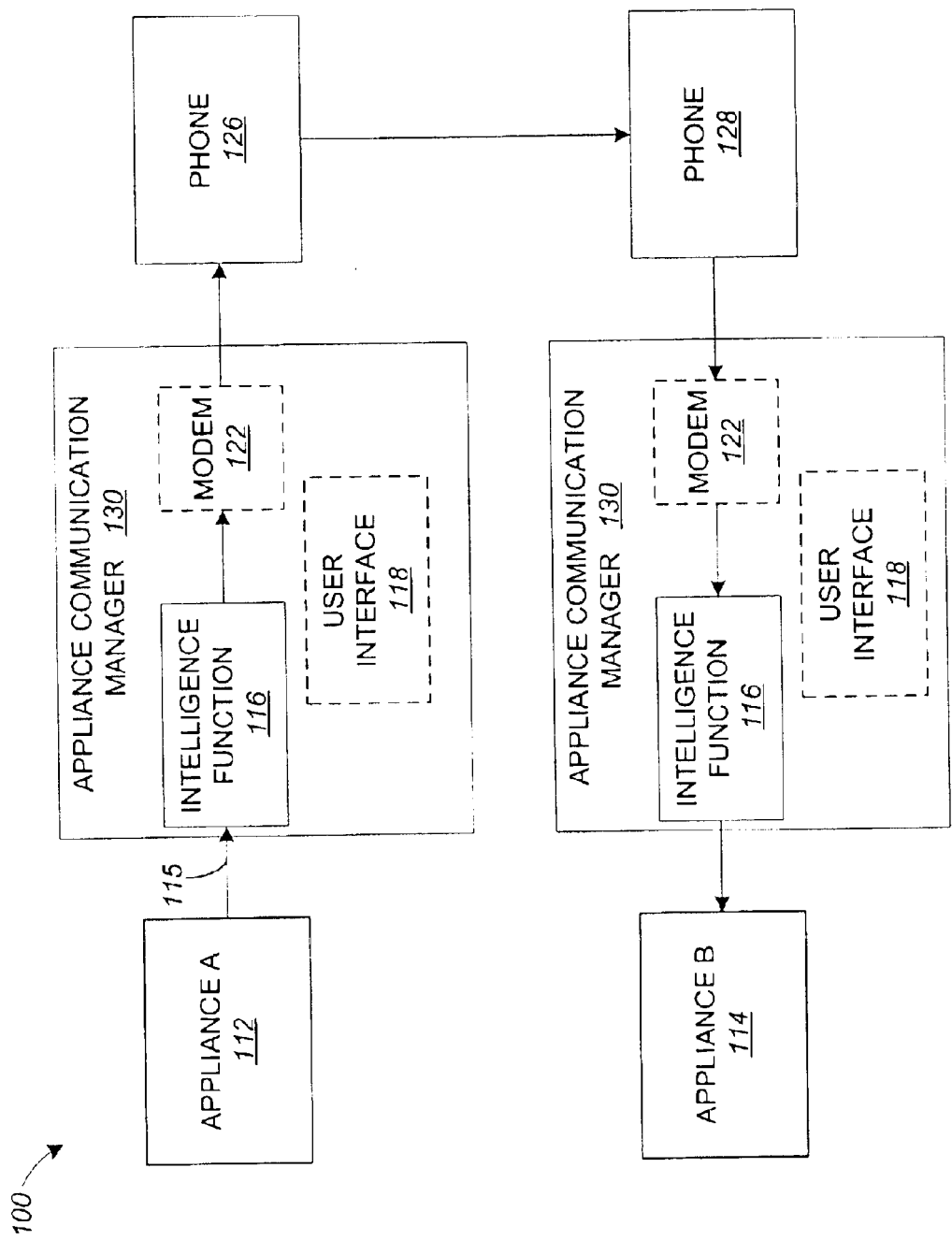
FIG. 3 is a block diagram of an appliance communication system implemented in accordance with the invention.

FIG. 3 is a block diagram illustrating the use of the appliance communication manager 130 of the invention. In this embodiment, appliance A 112 communicates with appliance B 114. To allow such communication, an appliance communications manager 130 is connected to appliance A 112 from which it receives signals 115. Appliance communications manager 130 includes a dedicated intelligence function 116 and optionally a modem 122. Intelligence function 116 interprets the appliance signals 115 to extract communication information, including the destination address and/or transmission frequency, the actual information that is to be transmitted, etc., for the transaction. Based on this information, intelligence function 116 sets up modem 122, which may be integrated into manager 130 as shown, or may reside external to appliance communications manager 130, and causes modem 122 to dial up phone 126. Phone 126 may be a plain old telephone system (POTS), a digital or analog cellular phone, etc. The phone 126 establishes logical connection with the destination appliance B 114, typically via a communication link from phone 128 to another appliance communications manager 130 connected to appliance B 114.

Figure 4:
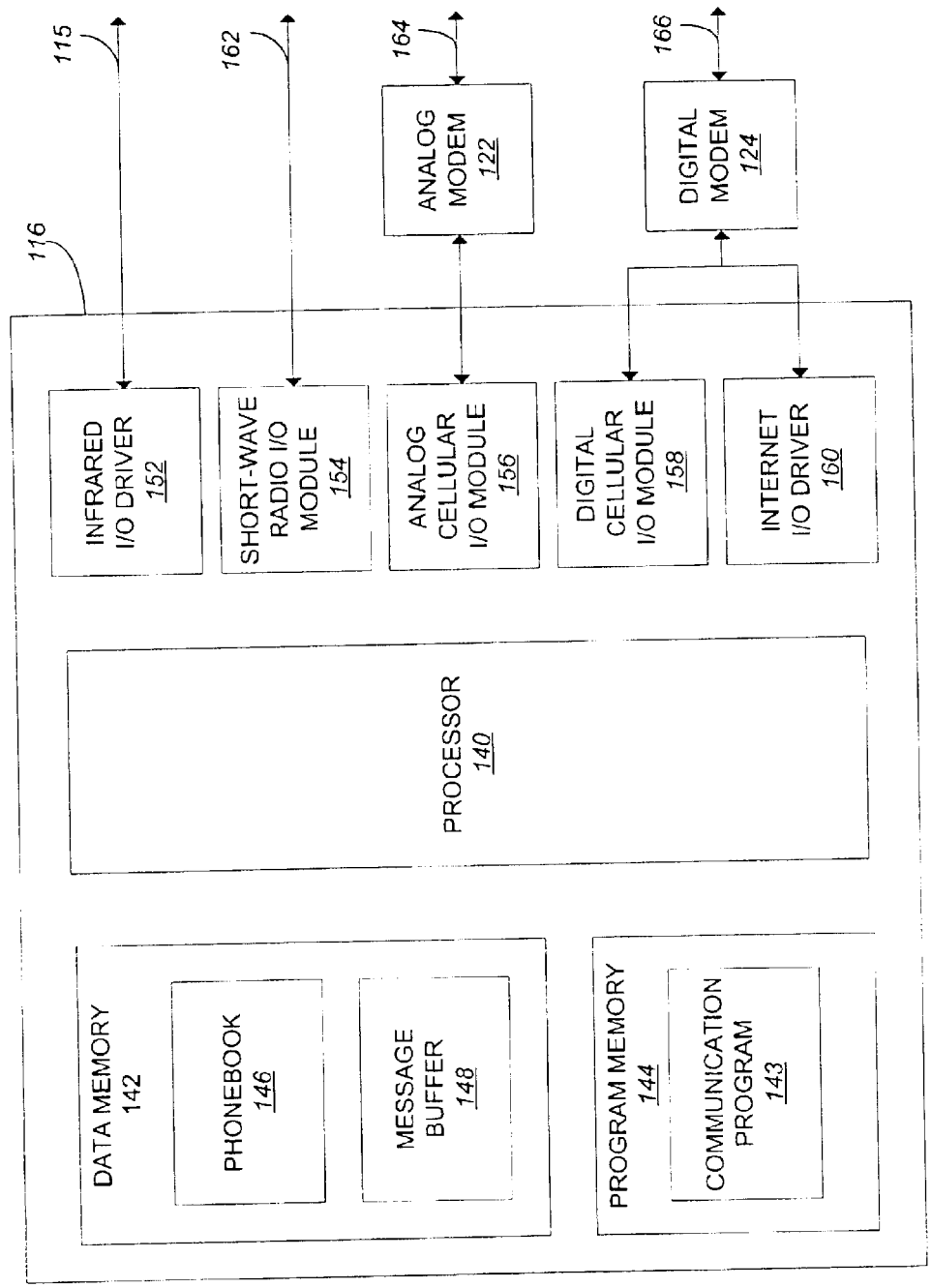
FIG. 4 is a functional block diagram of an intelligence function implemented in accordance with the invention.

FIG. 4 is a functional block diagram of intelligence function 116. As illustrated, intelligence function 116 comprises a processor 140, data memory 142, program memory 144, and one or more I/O drivers 152, 154, 156 and 158. Program memory 144 stores communications programs 143, which control communication transactions via the appropriate I/O driver 152, 154, 156, 158, according to the communication transaction information for the particular communication transaction in process. Data memory 142 stores communication transaction information input by the user such as names, associated phone numbers, and associated appliance interface information such as which I/O driver should be used to establish communication with the associated appliance.

Appliance communication manager 130 may include as many I/O drivers 152, 154, 156, 158 as needed to establish logical communication connections for various communication technologies. For example, it may be desired to allow an appliance that communicates via infra-red (IR) communication to communicate with other appliances via short-wave radio, analog cellular phones, digital cellular phones, and the Internet. In the prior art, this would require the appliance itself to include an I/O driver for each of the different possible communication technologies, namely, an IR I/O communication module, a short-wave radio communication module, an analog cellular telephone communication module including an analog modem 122, a digital cellular telephone communication module including a digital modem, and an Internet communication module. Using the appliance communications manager of the present invention, an appliance that communicates using one particular technology can achieve the ability to communicate with other appliances that communicate using a different technology without having all of the additional hardware modules necessary to achieve the communication. In particular, the appliance simply hooks up to the appliance communications manager 130 of the invention using its standard communication technology, and the appliance communications manager 130 receives the communication, translates it into a standard communications protocol, and sends it to the destination appliance using the I/O driver appropriate to the communications technology used by the destination appliance. Accordingly, appliance communications manager 130 preferably includes at least the I/O communications modules and drivers necessary for communication with both the source appliance and destination appliance, and can include two or more of an IR I/O communications module 152, a short-wave radio communication module 154, and analog cellular telephone communication module 156 which communicates with an analog modem 122, a digital cellular telephone communication module 158 which communicates with a digital modem 124, and an Internet communication module 160, which communicates with an Internet Service Provider (ISP) via either an analog 122 or digital 124 modem. Preferably, appliance communications manager 130 is a portable, stand-alone device that connects to various appliances to enable them to communicate with other appliances using different communications technologies.

In the preferred embodiment, all communications 115, 162, 164, 166 received into and transmitted from appliance communications manager 130 are implemented using a standard communication protocol. In the preferred embodiment, the standard communication protocol is Hewlett Packard's JetSend™ communications protocol. JetSend™ is a communications protocol for device independent information exchange. The protocol allows two devices to connect, intelligently negotiate the best possible data type, provide device status, and exchange information, without user intervention. JetSend™ is platform independent and enables communication between a broad range of appliances and data formats across any reliable, bi-directional transport medium (Internet, intranet, phone lines, infrared, etc.). JetSend™ operates as on-board intelligence allowing appliances to communicate directly with one another without the need for a server or detailed information (such as a device driver) to communicate with another JetSend™ appliance. JetSend also allows exchange of control information (e.g., multiple destination appliance addresses for establishing multiple simultaneous connections with the each of the selected destination appliances, or appliance configuration commands such as sending a multicopy command or paper size setting command to a printer).

In an illustrative example, appliance communications manager 130 is connected to a source appliance A 112 which communicates via infrared technology. Infrared communication interfaces are particularly desirable for use in small and portable computing devices. For example, some notebook computers include an IR port for high speed data transmission. A high speed IR port is used for sending data from the notebook computer to a printer or for transferring data between the notebook computer and a docking station, a desktop computer, a network server computer, another notebook computer or a personal digital assistant computing device (PDA). In this example, appliance communications manager 130 includes an infrared (IR) communications module 152, which allows a logical communication connection to be established via an IR communication link 115 between the source appliance A 112 and the appliance communications manager 130. A characteristic of the IR communication module 152 is the lack of a wire for carrying signals between the appliance communications manager 130 and the appliance 112. The lack of a wire reduces the number of components a user handles and reduces the weight of appliances to be transported. The lack of a wire also makes the process for connecting to another appliance an automated process.

Also in the example of FIG. 4, appliance communications manager 130 includes I/O communications modules 154, 156, 158 and 160, which allow a source appliance communicating via one communications technology (e.g., IR) to communicate with other destination appliances that communicate using a different communications technology (e.g., short-wave radio, analog cellular telephone, digital cellular telephone, and the Internet). Thus, source appliance A 112 can communicate with any other appliance so long as the other appliance can communicate over IR, short-wave radio, analog or digital cellular telephone, or IP network, and communicates using the standard appliance protocol.

In the preferred embodiment, data memory 142 stores a phonebook 146 which includes address communication information for various destination appliances. The phonebook information includes a phonebook entry for each destination appliance. Preferably, each phonebook entry includes a name associated with the destination appliance and any necessary network communication information required to establish a logical connection with the associated destination appliance.

Data memory 142 also preferably includes a message buffer 148. Typically, the transfer time between the source appliance and appliance communications manager 130 will be much faster than the transfer time between the appliance communications manager 130 and destination appliance due to the typical closer proximity of the appliance communications manager 130 to the source appliance 112 than to the destination appliance 114, and also since the communication technology of the source application (e.g., direct wire, or wireless IR technology) is typically high speed, whereas the communication technology to the destination appliance 114 (e.g., cellular telephone) is typically a lower speed technology. Communication messages received from source appliance 112 are stored temporarily in message buffer 148 until a connection with the desired destination appliance is established and the messages are transmitted over the connection to the connected destination appliance. Communication messages may include connection establishment messages such as transfer format messages and data format messages, and data messages containing actual appliance data.

Figure 5:
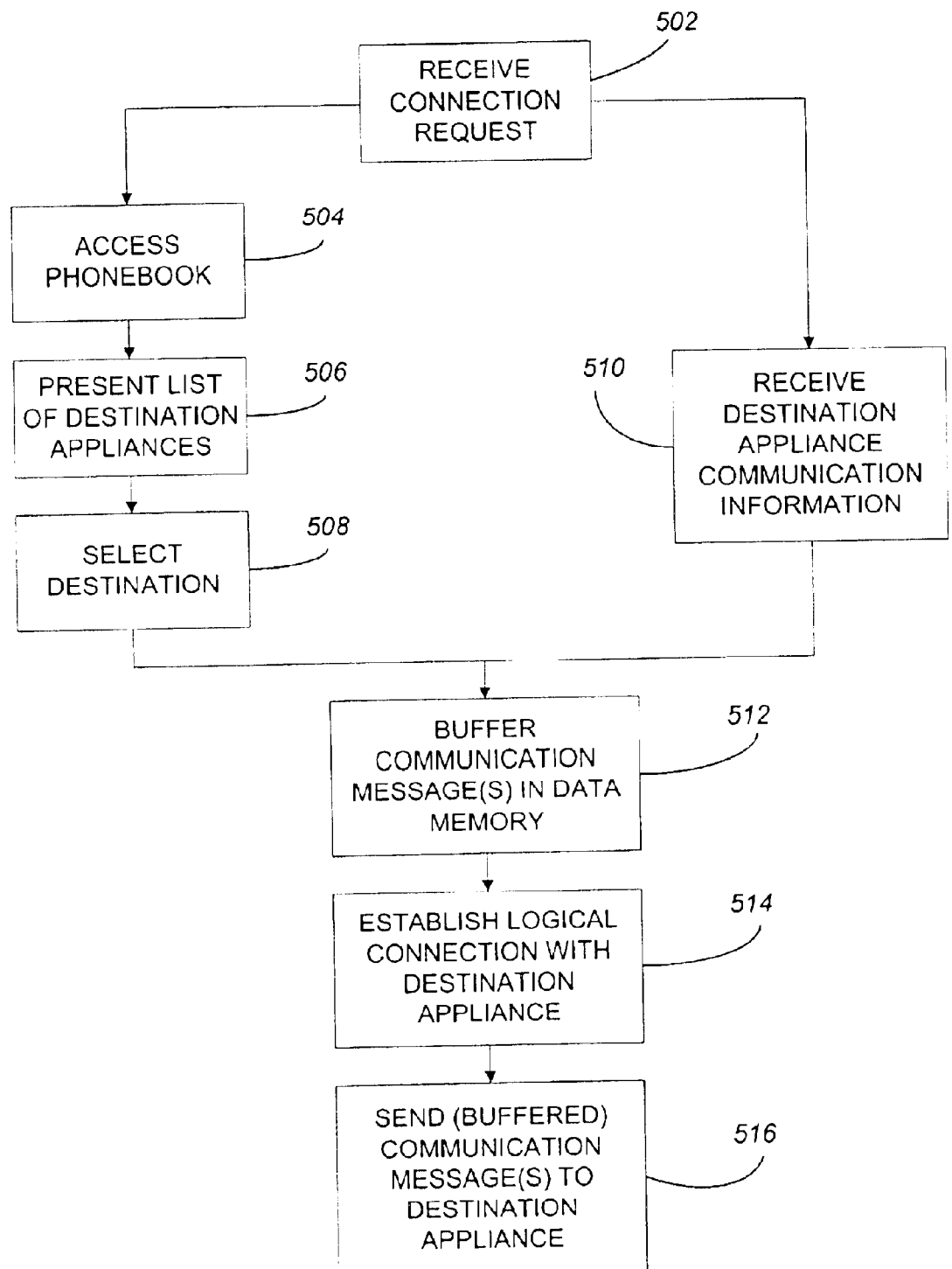
FIG. 5 is a flowchart of a communication transaction performed by an appliance communications manager implemented in accordance with the invention.

FIG. 5 is a flowchart of a communication transaction performed by the appliance communications manager 130 of the invention. As illustrated, appliance communications manager 130 receives 502 a connection request. Processor 140 accesses 504 phonebook 145 in data memory 142 and presents 506 a list of destination appliance options either back to the source appliance via a communications message, or via an optional user interface 118 supplied with the appliance communications manager 130. The user selects 508 a destination appliance from the presented list of destination appliance options. Alternatively, the user inputs 510 a destination appliance identifier and associated destination appliance communication information. In an optional step, processor 140 downloads 512 the communication message(s) from appliance 112 into message buffer 148 of data memory 142. Processor 140 establishes 514 a logical connection with the destination appliance for the communication transaction (e.g., sets up a modem or establishes an Internet connection) via the appropriate I/O driver 154, 156, 158, 160. Once a logical connection is established, processor 140 sends 514 the communication message(s) stored in data memory 142 to the destination appliance.

It will be appreciated from the above detailed description that the present invention provides significant advantages over the prior art. By providing a generic appliance communications manager that interfaces via a standard appliance communication protocol with a wide variety of different appliances from a variety of manufacturers, the appliance communications manager of the invention facilitates direct appliance-to-appliance connection without the use of intervening equipment such as a computer system. In addition, the invention hides all the connection setup tasks from the user, thereby simplifying and reducing the amount of time required to establish an appliance-to-appliance connection and complete the communication transaction.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method comprising:

receiving, via one of a plurality of different types of input/output (I/O) communication modules of an appliance communications manager that stands apart from a number of source and destination appliances, a connection request from a first source appliance;

receiving at the appliance communications manager, destination appliance communication information for a first destination appliance;

receiving at the appliance communications manager, a communication message from the first source appliance;

storing the communication message in a data memory of the appliance communications manager;

establishing, via one of the plurality of different types of I/O communication modules of the appliance communications manager, a communication link with the first destination appliance; and transferring the stored communication message to the first destination appliance via the communication link.

2. The method of claim 1, wherein:

receiving a communication message comprises receiving a communication message via a first communication technology and a first one of said I/O communication modules; and establishing a communication link comprises establishing a communication link via a second communication technology and a second one of said I/O communication modules, the second communication technology being different than the first communication technology.

3. The method of claim 1, wherein establishing the communication link comprises establishing, via the appliance communications manager, an infrared communication link using one of said I/O communication modules.

4. The method of claim 1, wherein establishing the communication link comprises establishing, via the appliance communications manager, an analog cellular communication link using one of said I/O communication modules.

5. The method of claim 1, wherein establishing the communication link comprises establishing, via the appliance communications manager, a digital cellular communication link using one of said I/O communication modules.

6. The method of claim 1, wherein the first source appliance comprises one of a printer, a scanner, a facsimile machine, an overhead projector, an appliance storage device, and an appliance whiteboard.

7. An apparatus comprising:
a plurality of input/output (I/O) communication modules of different types to receive i) connection requests from a plurality of source appliances, ii) destination appliance communication information for a plurality of destination appliances, and iii) communication messages from said source appliances;
data memory to store the communication messages received from the source appliances; and
a processor to access the data memory, to establish communication links with destination appliances that are subjects of said received connection requests, and to transfer the stored communication messages to the destination appliances via the communication links.

8. The apparatus of claim 7, wherein first and second I/O communication modules, respectively interfacing with source and destination appliances that are parties to a communication, implement different communication technologies.

9. The apparatus of claim 7, wherein one of the I/O communication modules provides an infrared I/O driver.

10. The apparatus of claim 7, wherein one of the I/O communication modules comprises an analog cellular I/O module.

11. The apparatus of claim 7, wherein one of the I/O communication modules comprises a digital cellular I/O module.

12. A system comprising:
a source appliance to transmit a connection request, destination appliance communication information for a destination appliance, and a communication message, to an appliance communications manager that stands apart from said source and destination appliances;
the appliance communications manager including i) a plurality of different types of input/output (I/O) communication modules from which one or more I/O communication modules for communicating with said source and destination appliances are selected, and ii) a data memory to store the communication message received from the source appliance, the appliance communications manager to transfer the stored communication message to the destination appliance; and
the destination appliance to receive the communication message from the appliance communications manager.

13. The system of claim 12, wherein the source appliance comprises one of a printer, a scanner, a facsimile machine, an overhead projector, an appliance storage device, and an appliance whiteboard.

14. The method of claim 1, wherein establishing the communication link comprises establishing, via the appliance communications manager, a short-wave radio communication link using one of said I/O communication modules.

15. The method of claim 1, wherein establishing the communication link comprises establishing, via the appliance communications manager, an internet communication link using one of said I/O communication modules.

16. The apparatus of claim 7, wherein one of the I/O communication modules provides a short-wave radio I/O module.

17. The apparatus of claim 7, wherein one of the I/O communication modules comprises an internet I/O driver.

* * * * *